United States Patent [19]

Whedon et al.

[11] Patent Number: 4,642,065

[45] Date of Patent: Feb. 10, 1987

[54] EXTENSIBLE GAME CALLER WITH REMOVABLE MOUTHPIECE

[76] Inventors: Parker Whedon, 11322 Carmel Chace Dr., Charlotte, N.C. 28226; Larry J. Hearn, Rte. 2, Box 217, Medon, Tenn. 38356

[21] Appl. No.: 771,619

[22] Filed: Sep. 3, 1985

[51] Int. Cl.⁴ .................... A63H 5/00; G10D 7/00
[52] U.S. Cl. ................................ 446/209; 84/330
[58] Field of Search ............ 446/203, 204, 205, 206, 446/207, 208, 209; 84/383 R, 383 A, 398, 399, 330, 375

[56] References Cited

U.S. PATENT DOCUMENTS

| | | | |
|---|---|---|---|
| 333,094 | 12/1885 | Fuller | 446/208 |
| 728,083 | 5/1903 | Childers | 446/209 |
| 795,480 | 7/1905 | Carson | 84/399 |
| 853,148 | 5/1907 | Alter | 446/208 |
| 949,021 | 2/1910 | Lenherr | 84/399 |
| 1,247,942 | 11/1917 | Enck | 446/204 |
| 1,311,690 | 7/1919 | Hakius | 446/205 X |
| 2,542,720 | 2/1951 | Soklaski | 446/209 |
| 2,544,370 | 3/1951 | Walther | 446/208 |
| 2,651,141 | 9/1953 | Bicocchi | 446/208 |
| 2,936,547 | 5/1960 | Weems | 446/208 |
| 4,211,031 | 7/1980 | Gambino | 446/208 |

Primary Examiner—Robert A. Hafer
Assistant Examiner—D. Neal Muir
Attorney, Agent, or Firm—Clifton Ted Hunt

[57] ABSTRACT

A turkey caller comprising a body portion with a removable mouthpiece connected in an airtight manner to one end and a trumpet reciprocably mounted on the other end of the body portion. A plurality of axially aligned passageways extend through the mouthpiece, body portion, and trumpet with the passageway in the trumpet being the largest in diameter and the other passageways being successively smaller as they extend in communication with each other through the trumpet, body portion, and mouthpiece. Air is sucked into the trumpet to produce sounds simulating wild game, such as turkeys.

10 Claims, 6 Drawing Figures

EXTENSIBLE GAME CALLER WITH REMOVABLE MOUTHPIECE

BACKGROUND OF THE INVENTION

Wild game calls, including turkey calls have long been known. The prior art includes game calls which are activated by blowing or sucking air through a passageway, with or without a reed or diaphragm, and game calls which are activated by manipulating one portion against another portion of the game call to produce a vibratory sound.

The present invention belongs to the former class of game calls, but without using a reed or diaphragm, and includes the use of removable mouthpieces of different sizes to produce different sounds and an extensible housing having a longitudinally extending air passage through which air is sucked to produce different sounds simulating the sounds made by turkeys.

U.S. Pat. No. 4,207,703 issued June 17, 1980 to Michael Saso for a GAME CALL is the most pertinent prior patent known to applicants. Saso discloses a game call made of plastic and which does not use a reed or diaphragm. It includes a variable chamber 10 closed by a plunger or piston 14. The piston 14 is movable within the chamber 10 to vary the length of the chamber, thereby affecting the tonal quality of the noise created by blowing into the game call. The Saso game call also includes a constant volume air chamber 6 closed by a cap 8. Air does not pass through the variable volume chamber 10 or the fixed volume chamber 6. In use, air blown into the two chambers exits through the vents 4 near the mouthpiece, the vents 4 being opened and closed by the user's fingers. The sounds produced by blowing into the Saso game may be varied by manipulating the piston 14 to change the volume of the variable volume chamber 10 and/or by opening and closing the vents 4 at the entrances of the variable volume chamber 10 and the fixed volume chamber 6.

SUMMARY OF THE INVENTION

The game call of the present invention utilizes removable mouthpieces having different lengths or different inside diameters and which are selectively connected to a throat portion to produce different sounds. The throat portion may be connected to an extensible variable volume chamber, on the principle of a trombone, except that air is sucked into and through the extensible variable volume chamber and through the successively smaller air passages in the throat and mouthpiece to produce desired sounds.

The game call comprises an end to end or axial assembly of elements, each element being provided with an axial or longitudinal air passage and the air passage in each of the elements communicating with the air passage in adjoining elements to define a continuous axial air passage communicating with the atmosphere at the opposite ends of the game call. One element of the game call may be slidably connected to a second element for the purpose of altering the length of the air passage and thereby affect the sound of the call.

It is an object of the invention to provide a turkey call or the like which is longitudinally extensible as desired to provide, within limits, an infinite variation of sounds.

It is another object of the invention to provide a turkey call comprising a throat portion having an axial air passage terminating at one end in an outwardly tapering cavity, and a removable mouthpiece having an axial air passage extending therethrough communicating with the air passage in the body portion. The mouthpiece includes an exteriorly tapered end portion extending inwardly toward and snugly receivable within the outwardly tapering cavity of the throat portion to prevent leakage of air. The mouthpiece is readily removable for replacement during hunting with another mouthpiece having a correspondingly tapered end portion but a different size axial air passage to produce a different sound, when desired.

It is still another object of the invention to provide a method of reestablishing the airtight connection of a mouthpiece which has become loosened, as by usage and normal wear, said method comprising the removal of a very small portion of the exteriorly tapered end of the mouthpiece, as by sanding off about a thousanth (0.001) of an inch. This provides a new surface contact and enables a renewed seating of the mouthpiece in the throat and an airtight connection.

Some of the objects of the invention having been stated, other objects will appear to those skilled in the art from the following description when considered in connection with the accompanying drawings.

DETAILED DESCRIPTION OF THE INVENTION

Figure 1:
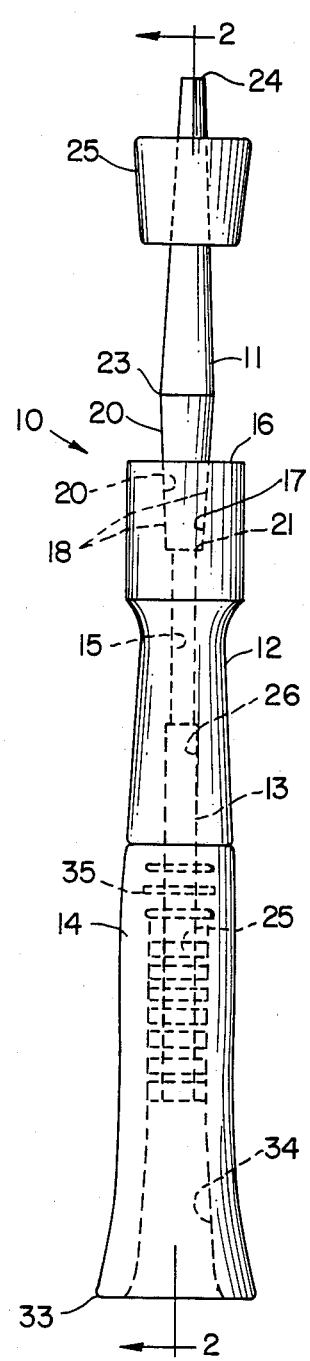
FIG. 1 is a plan view of an extensible turkey call with a removable mouthpiece illustrated in its closed position and with the mouthpiece operatively connected to the base.

Referring more specifically to the drawings, the numeral 10 broadly indicates the turkey caller of the present invention which is of overall tubular configuration comprising a mouthpiece 11, a base or throat 12 terminating in a reduced extension or receiver 13, and a longitudinally movable trumpet 14.

The throat 12 has an axially extending air passage 15 communicating adjacent one end 16 of base 12 with a larger diameter cavity 17 defined by walls 18 tapering outwardly from a shoulder 19 at the juncture of cavity 17 with air passage 15 so that the diameter of the cavity 17 at the outer end wall 16 is larger than the diameter of the cavity 17 at the shoulder 19.

Figure 2:
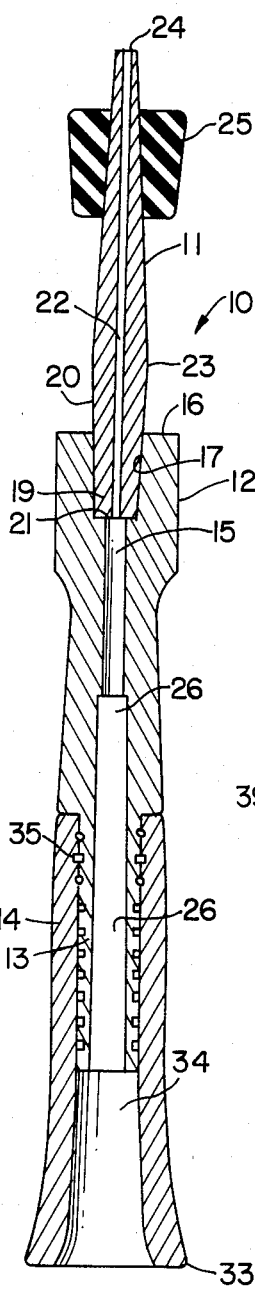
FIG. 2 is a sectional view taken substantially along the line 2—2 in FIG. 1.

The outwardly tapered cavity 17 snugly receives a correspondingly dimensioned and exteriorly tapered end portion 20 of the removable mouthpiece 11 with the free inner end 21 of the tapered end portion 20 seated in airtight engagement against the shoulder 19 in cavity 17. The mouthpiece 11 has an axially extending air passage 22 of a uniform dimension extending therethrough and communicating with its opposite ends. The air passage 22 extends through the mouthpiece 11 and communicates directly with the air passage 15 through the throat 12 (FIG. 2).

The tapered portion 20 of mouthpiece 11 extends from its end within the cavity 17 to a point 23 spaced outwardly beyond the end 16 of the throat 12. The exterior surface of the mouthpiece 11 is reversely tapered begining at point 23 and extending to its outer end 24. The outer end 24 of the mouthpiece 11 is put in the user's mouth during operation to draw air through the call 10 and produce the desired sound. A baffle 25 is frictionally retained on the mouthpiece 11 in spaced relation from the outer end 24 for engagement by the user's lips to prevent ambient atmospheric air from being drawn in the user's mouth and to focus the user's energy on drawing in air through the turkey call.

The air passage 15 within the throat 12 extends outwardly from the cavity 17 and in alignment with air passage 22 in mouthpiece 11 to an enlarged bore 26. The enlarged bore 26 extends outwardly from the air passage 15 to and through the reduced extension 13. The extension 13 is illustrated as being formed integral with the throat 12, but may be formed separately and fixed against relative movement to the throat 12, if desired. The extension 13 is of tubular configuration and its outer surface has a series of annular grooves 30 of rounded shoulder uniformly spaced from each other in a longitudinal direction and defining ridges 31 between them.

The trumpet 14 has an inner end 32 and an outwardly flared end portion 33 with an axially extending air passage 34 communicating at inner end 32 with air passage 26 in extension 13 and the flared end portion 33.

Figure 4:
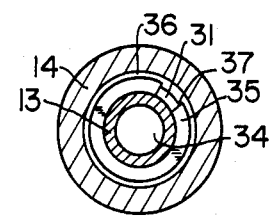
FIG. 4 is a sectional view taken substantially along the line 4—4 in FIG. 3.
Figure 3:
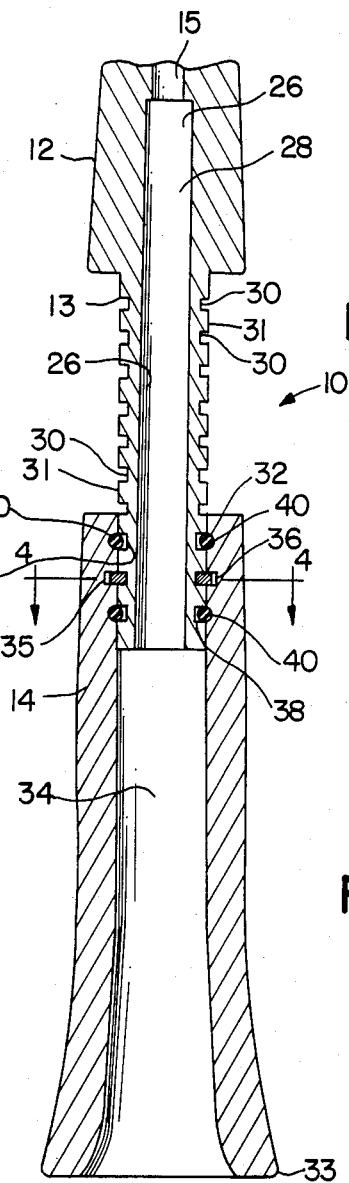
FIG. 3 is an enlarged sectional view similar to FIG. 2 but with parts broken away and illustrating the turkey call in its extended position.

The inner end 32 of the trumpet 14 is connected to the extension 13 by a split metal ring 35 of circular stock material seated in an annular groove 36 extending about and communicating with the air passage 34 in trumpet 14. The expansion ring 35 is split as at 37 (FIG. 4) to enable the ring 35 to alternately expand and contract as it is moved across ridges 31 and seated in selected grooves 30 in extension 13. In this way, the trumpet 14 may be moved to any selected position between the fully closed position of FIG. 2 and the fully extended position of FIG. 3.

The trumpet 14 has additional annular grooves 38 and 39 spaced on either side of annular groove 36 a sufficient distance to register with opposing annular grooves 30 on the surface of extension 13. Resilient O-rings 40 are mounted in the annular grooves 38 and 39 to provide an airtight seal between the extension 13 and trumpet 14.

In use, a user places the end 24 of mouthpiece 11 in his mouth until his lips engage the buffer 25 so that the user's lips meet behind the mouthpiece end 24 and then sucks air inwardly through the aligned air passages 34, 26, 15 and 22 of the turkey call 10 so that the lips vibrate. The trumpet 14 may be reciprocated on the extension 13 while air is being drawn through the aligned air passages to provide different sounds. Alternatively, the trumpet may remain in a selected position on the extension 13.

Figure 5:
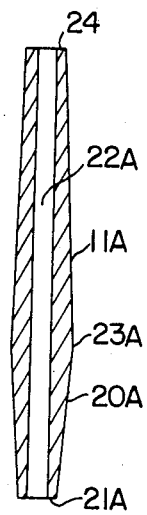
FIG. 5 is a sectional view of a removable mouthpiece having an end portion tapered for snug engagement with the base but having a larger diameter air passage and thereby a different amount of air volume than the mouthpiece shown in FIGS. 1 and 2.
Figure 6:
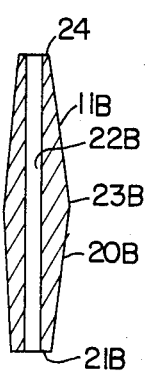
FIG. 6 is a sectional view of another removable mouthpiece like that shown in FIG. 5 but having a shorter length and a different diameter air passage.

FIGS. 5 and 6 illustrate mouthpieces of different configurations to provide different sounds. The different configurations primarily comprise changes in the diameter of the air passage 22 to produce different sounds, but different sound may be provided by changing the overall length of the mouthpiece. In each case, though, the mouthpiece includes an exteriorly tapered end portion 20A or 20B corresponding to the outward taper of the cavity 17 in the throat 12 of the turkey call. Thus, the mouthpiece 11A in FIG. 5 and the mouthpiece 11B in FIG. 6 each have a tapered end portion 20A and 20B, respectively, corresponding to the tapered portion 20 on the mouthpiece 11 in FIG. 1. The mouthpieces 11, 11A, and 11B may be interchanged and snugly seated in airtight engagement with the tapered cavity 17 of the turkey call 10 to produce different sounds.

Repeated changing of the mouthpieces inevitably causes wear and loss of an airtight connection with the throat 11. An advantage of the tapered fit is that an airtight connection can be easily reestablished by sanding away a very small portion (0.001 inch) of the inner free end 21 of the mouthpiece to present new surface—to—surface contact and an airtight fit.

Note that the diameter of the air passage 22A in FIG. 5 is larger than the diameters of the air passage 22B in FIG. 6 and the air passage 22 in FIG. 2. The different sizes of air passages produces different sounds. Note also that the mouthpiece 11B is shorter than either of the mouthpiece 11 or 11A. The length of the mouthpiece also affects the sound of the turkey call.

As most clearly seen in FIG. 2, air drawn into the turkey call 10 passes through successively smaller passages 34, 26, 15, and 22. Successful results have been obtained using mouthpieces between $2\frac{2}{3}$ and $3\frac{1}{4}$ inches long with the air passages 20 ranging from 1/16 to $\frac{1}{8}$ of an inch with an assembled throat and trumpet having a combined length from $5\frac{1}{4}$ to $6\frac{3}{4}$ inches (without the mouthpiece) and the air passage 15 through the throat 12 measuring $\frac{1}{8}$ to $\frac{1}{4}$ of an inch in diameter. The enlarged bore 26 in the throat 12 may measure about $\frac{1}{4}$ to $\frac{3}{8}$ of an inch and the air passage through the trumpet is about $\frac{1}{2}$ inch in diameter at its inner end and flares outwardly to a diameter of one inch at the flared outer end 33.

The successive restriction of the air passages subjects the air to increasing pressure as it is drawn through the turkey call and enables a skilled user to closely imitate the sounds of a turkey. A wide variation of sounds can be produced with the turkey call in the closed position of FIG. 2, and an even larger variety of sounds can be produced by manipulating the extensible trumpet 14. Substitution of another mouthpiece with a different diameter bore or a different length offers still further variations in sound. A skilled user is thus enabled to closely imitate the wide variety of sounds emitted by turkeys and thereby lure the turkeys within range.

It is also contemplated that the throat 12, the extension 13, and the trumpet 14 may be made as an integral unit with the mouthpiece 11 being replaceable with another mouthpiece having a different length and/or internal diameter.

There is thus provided an improved turkey call which may be ecnomically manufactured and efficiently used by a skilled user to reliably imitate the sounds of turkey at different stages of the hunting season.

We claim:

1. A turkey caller comprising a group of mouthpieces each having an axially extending air passage extending therethrough and communicating with opposite ends of the mouthpiece, the air passage in each mouthpiece of said group having a different air volume to produce a different basic sound than the other mouthpieces of said group, a throat portion having an axially extending air passage therethrough of a diameter larger than the diameter of any air passage in said group of mouthpieces and communicating with the air passage in a selected mouthpiece, a trumpet having an axially extending air passage therethrough of a diameter larger than the diameter of the air passage in the throat portion and communicating with the air passage through the throat and tapering outwardly therefrom, means releasably connecting a selected mouthpiece to the throat with their respective air passages aligned in an air tight manner, and the air passages through the trumpet, throat, and a selected mouthpiece being coaxially arranged to provide a continuous airtight progressively reduced air passage from the trumpet to the free end of a selected mouthpiece.

2. A structure according to claim 1 wherein said means for releasably connecting a selected mouthpiece to the throat comprises an exteriorly tapered end portion on the mouthpiece and said throat having a correspondingly tapered cavity snugly receiving the tapered end portion of the mouthpiece.

3. A structure according to claim 1 wherein means are provided for changing the overall length of the turkey caller to change the length and air volume of the turkey caller.

4. A structure according to claim 3 wherein said last named means comprises an extension projecting outwardly from the end of the throat opposite said a selected mouthpiece, and means connecting the trumpet to said extension in an airtight manner for longitudinal slidable movement thereon.

5. A structure according to claim 4 wherein said means connecting the trumpet to said extension in an airtight manner for longitudinal slidable movement thereon cmprise a plurality of annular grooves spaced longitudinally along the surface of said extension and defining annular ridges therebetween, an annular groove communicating with the air passage through said trumpet, a split expansion ring mounted in the annular groove in the trumpet and selectively registrable with a desired annular groove on said extension.

6. A structure according to claim 5 wherein at least one O-ring extends between the trumpet and the extension to provide an airtight connection.

7. A structure according to claim 6 wherein there is at least one additional annular groove communicating with the air passage through the trumpet, said annular grooves in the trumpet being spaced from each other a distance corresponding to the spacing of the annular grooves spaced longitudinally along the surface of said extension, and said O-ring being positioned in said additional annular groove in the trumpet and selectively registrable with an annular groove in the extension.

8. A structure according to claim 7 which includes two annular grooves in the trumpet and spaced on either side of the split expansion ring a distance corresponding to the spacing of the annular grooves in the extension, and an O-ring mounted in each of said two annular grooves in the trumpet.

9. A turkey caller comprising a throat and a trumpet each having an axial air passage with the air passages communicating with each other and defining a continuous progressively smaller air passage from the trumpet to a selected mouth piece, a group of mouthpieces each having an axial air passage of a different air volume to produce a different basic sound and means for releasably connecting a selected mouthpiece to the throat with the air passage in the mouthpiece communicating with the air passage in the throat, and means for changing the overall length of the air passage through the turkey caller, whereby a user is enabled to select a mouthpiece to produce a range of sounds and to produce a variety of sound with a selected mouthpiece by changing the overall length of the air massage through the turkey caller.

10. A turkey caller enabling a user to imitate the sound of a specific turkey being hunted, said turkey caller including a mouthpiece at one end, an intermediate throat and a trumpet at the other end and having an air passage therethrough of progressively smaller diameter as it extends from the trumpet to the mouthpiece, means mounting said trumpet for movement relative to the throat to change the overall length of the air passage through the turkey caller, and means for changing the air volume of the mouthpiece, whereby each mouthpiece will produce a basic selected sound and the selected length of the air passage through the turkey caller will modify the basic sound produced by the mouthpiece.

* * * * *